(12) United States Patent
Bagasra

(10) Patent No.: US 8,737,430 B2
(45) Date of Patent: May 27, 2014

(54) DETERMINING MAXIMUM BANDWIDTH IN A MIXED VERSION MOCA DEPLOYMENT

(75) Inventor: Abbas Bagasra, Concord, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 223 days.

(21) Appl. No.: 13/446,358

(22) Filed: Apr. 13, 2012

(65) Prior Publication Data

US 2013/0272117 A1    Oct. 17, 2013

(51) Int. Cl.
*H04J 3/22*  (2006.01)
*H04J 3/16*  (2006.01)

(52) U.S. Cl.
USPC .......................................... 370/468; 370/229

(58) Field of Classification Search
USPC ................................................. 370/468, 229
See application file for complete search history.

(56) References Cited

U.S. PATENT DOCUMENTS

| | | | |
|---|---|---|---|
| 8,483,152 B1* | 7/2013 | Mueller | 370/329 |
| 2009/0310615 A1* | 12/2009 | Bernard et al. | 370/401 |
| 2010/0183027 A1* | 7/2010 | Mueller | 370/468 |
| 2010/0229015 A1* | 9/2010 | Hebron et al. | 713/323 |
| 2010/0238790 A1* | 9/2010 | Liu et al. | 370/216 |
| 2011/0080517 A1* | 4/2011 | Zhou | 348/433.1 |
| 2011/0107404 A1* | 5/2011 | Ramsdell et al. | 726/5 |
| 2011/0116419 A1* | 5/2011 | Cholas et al. | 370/259 |
| 2012/0096492 A1* | 4/2012 | Urban et al. | 725/39 |

* cited by examiner

*Primary Examiner* — Kenny Lin

(57) ABSTRACT

A method, performed by a computer device, may include identifying Multimedia over Coaxial Alliance nodes associated with a customer's network; querying particular pairs of the identified Multimedia over Coaxial Alliance nodes for physical rates to obtain reported physical rates for the particular pairs of the identified Multimedia over Coaxial Alliance nodes; and querying particular ones of the identified Multimedia over Coaxial Alliance nodes for supported Multimedia over Coaxial Alliance versions. The method may further include determining a maximum bandwidth for the customer's network based on the reported physical rates and based on the supported Multimedia over Coaxial Alliance versions.

20 Claims, 8 Drawing Sheets

US 8,737,430 B2

DETERMINING MAXIMUM BANDWIDTH IN A MIXED VERSION MOCA DEPLOYMENT

BACKGROUND INFORMATION

A customer may have multiple multimedia devices in the customer's home. The multimedia devices may be connected with coaxial cables and multimedia content may be sent or received over the coaxial cables based on the Multimedia over Coaxial Alliance (MoCA) standard. The MoCA standard may include different versions and different multimedia devices in the customer's home may support different versions of the MoCA standard. Management of resources in a network, which includes devices associated with different MoCA versions, may be challenging.

DETAILED DESCRIPTION OF PREFERRED EMBODIMENTS

The following detailed description refers to the accompanying drawings. The same reference numbers in different drawings identify the same or similar elements.

An implementation described herein may relate to determining a maximum bandwidth in a mixed version Multimedia over Coaxial Alliance (MoCA) deployment. MoCA versions 1.1 and 2.0 may support parameterized Quality of Service (QoS), which may allow a server to reserve bandwidth, between the server and an Internet Protocol (IP) client endpoint on a MoCA connection, for sending multimedia streams. In a deployment of a network where the server, providing a multimedia stream, is on a MoCA medium and the IP client endpoint, receiving the multimedia stream, is on a non-MoCA medium (e.g., Ethernet or Wifi), it may be necessary to use an admission and control algorithm to prevent over-subscription of multimedia streams on the network.

Figure 1:
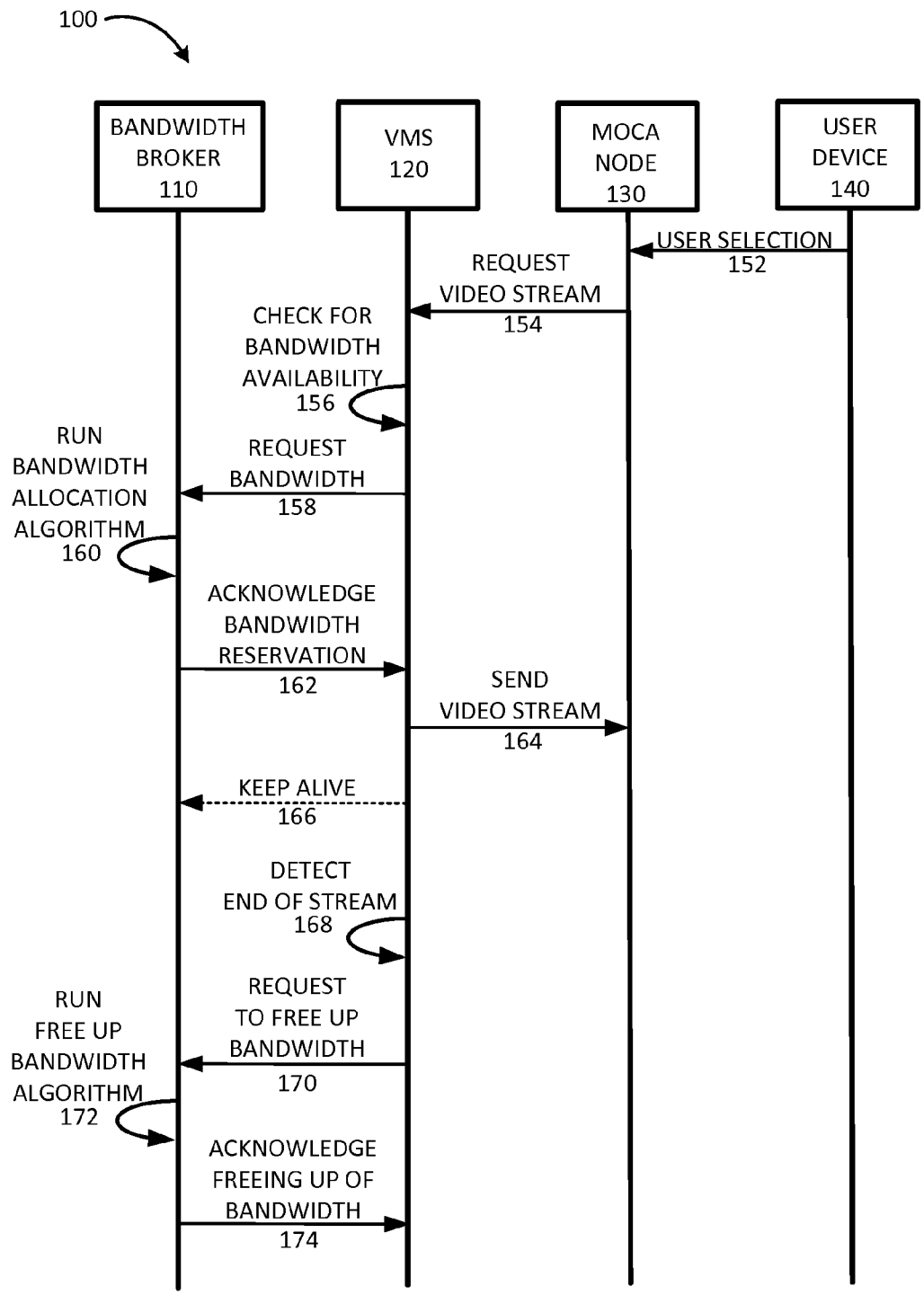
FIG. 1 is a diagram illustrating an exemplary signal flow for reserving bandwidth according to an implementation described herein.

FIG. 1 is a diagram illustrating an exemplary signal flow 100 for reserving bandwidth according to an implementation described herein. As shown in FIG. 1, signal flow 100 may include signals sent between a bandwidth broker 110, a video management server (VMS) 120, a MoCA node 130, and a user device 140. Bandwidth broker 110 and VMS 120 may correspond to logical units within a management entity, such as a home router located on a customer's premises. MoCA node 130 may correspond to any device enabled to receive a multimedia stream over MoCA (e.g., a set-top box) and user device 140 may correspond to a device used to control MoCA node 140 (e.g., a remote control).

Signal flow 100 may include user device 140 sending a user selection to MoCA node 130 (signal 152). For example, a user may select a particular television channel on a set-top box. MoCA node 130 may request a video stream from VMS 120 (signal 154) and VMS 120 may check for bandwidth availability (item 156). If VMS 120 determines that there is available bandwidth, VMS 120 may request bandwidth for the requested video stream from bandwidth broker 110 (signal 158). Bandwidth broker 110 may run a bandwidth allocation algorithm to reserve requested bandwidth (item 160) and may send an acknowledgement of the bandwidth reservation to VMS 120 (signal 162). Once VMS 120 confirms that the bandwidth has been reserved, VMS 120 may start sending the requested video stream to MoCA node 130 (signal 164).

VMS 120 may keep sending keep alive messages to bandwidth broker 110 while the video stream is being sent to MoCA node 130 to ensure the bandwidth remains reserved (signal 166). When VMS 120 detects the end of the stream (item 168), VMS 120 may send a request to bandwidth broker 110 to free up the reserved bandwidth (signal 170). In response, bandwidth broker 110 may run an algorithm to free up the bandwidth (item 172) and may send an acknowledgement to VMS 120 that the bandwidth has been freed up (signal 174).

Although FIG. 1 shows exemplary signals of signal flow 100, in other implementations, signal flow 100 may include fewer signals, different signals, differently arranged signals, or additional signals than depicted in FIG. 1.

Thus, bandwidth broker 110 may keep track of the bandwidth usage in the network and may maintain information about the total available bandwidth. When a server wants to send a multimedia stream to another IP endpoint in the network, the server may request the required bandwidth for the multimedia stream from bandwidth broker 110. Bandwidth broker 110 may accept or deny the request based on the available bandwidth. In order for bandwidth broker 110 to implement an admission and control algorithm to accept or deny requests for bandwidth, bandwidth broker 110 may need to be able to determine the maximum available bandwidth per interface type. In a customer premises network, the interface types may include an Ethernet interface type, a WiFi interface type, and a MoCA interface type. Computation of the maximum bandwidth for a MoCA interface may be complicated by the fact that different version of MoCA may support different bandwidths. In a network where two different MoCA nodes are associated with different supported MoCA versions (e.g., a digital video recorder (DVR) that supports MoCA version 1.1 and a set-top box that supports MoCA version 2.0), the maximum bandwidth may be the lower value of the maximum bandwidth supported by each of the two MoCA nodes. However, computation of the maximum bandwidth may not scale up and may be difficult to implement in a home router that manages a customer premises network.

An implementation described herein may include identifying MoCA nodes associated with a customer's network, obtaining reported physical rates for pairs of the identified MoCA nodes; obtaining a supported MoCA version for each of the identified MoCA nodes, and generating a table of all pairs of the identified MoCA nodes. A normalized physical rate for each of the pairs in the table may be determined by applying a normalized ratio, associated with the two MoCA versions of the two nodes in a pair of nodes, to the reported physical rate of the pair of nodes, in the pair of nodes. The maximum bandwidth for the customer's network may be determined based on the minimum normalized physical rate for the pairs in the table.

Figure 2:
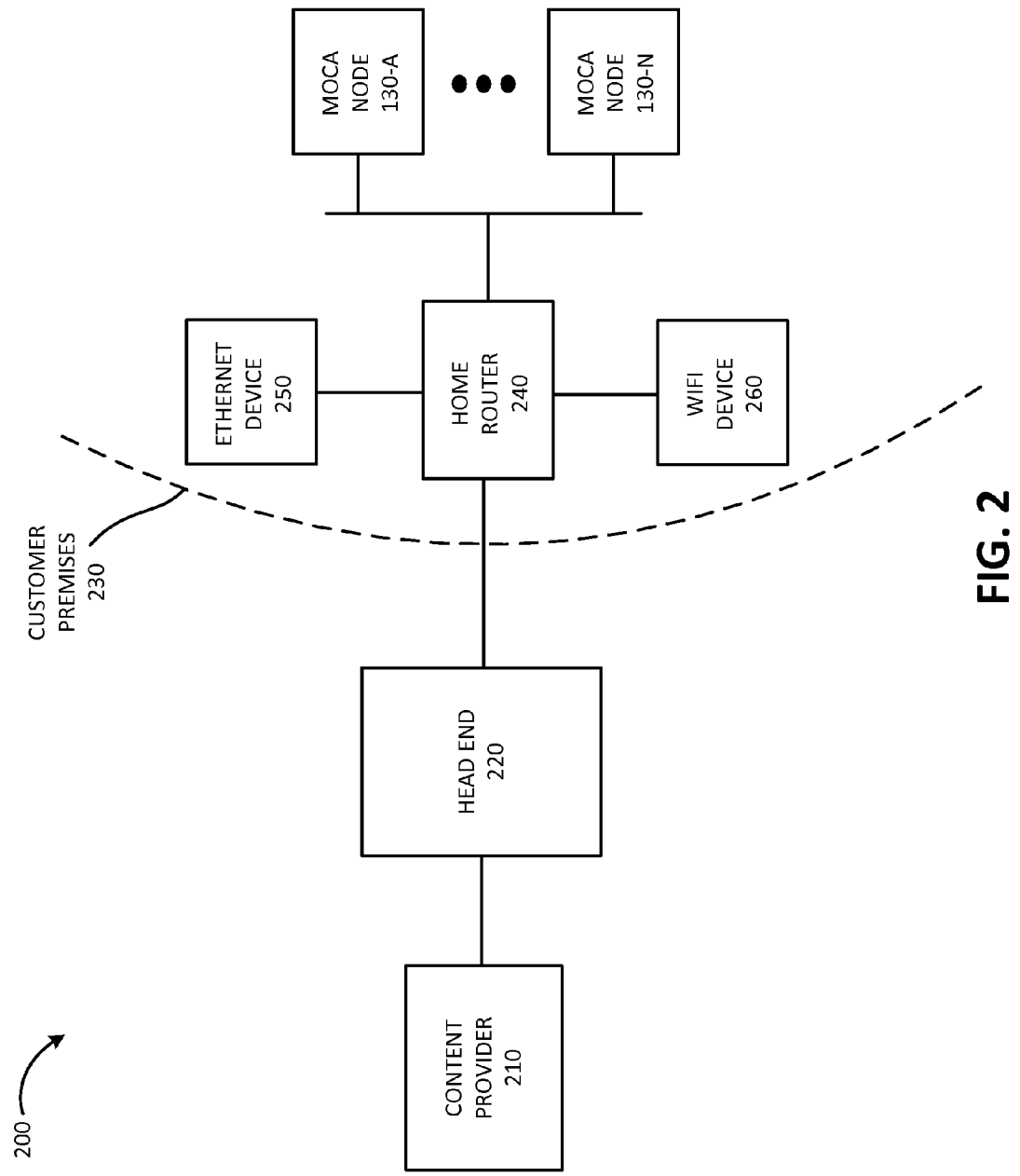
FIG. 2 is a diagram of an exemplary environment according to an implementation described herein.

FIG. 2 is a diagram of an exemplary environment 200 in which the systems and/or methods described herein may be implemented. As shown in FIG. 2, environment 200 may include a content provider 210, a head end 220, and customer premises 230.

Content provider 210 may include one or more devices, such as server devices, that provide content to head end 220. For example, content provider 210 may include free television broadcast providers (e.g., local broadcast providers, such as NBC, CBS, ABC, and/or Fox), for-pay television broadcast providers (e.g., TNT, ESPN, HBO, Cinemax, CNN, etc.), a server device associated with an online multimedia game, and/or Internet-based content providers (e.g., Youtube, Vimeo, Netflix, Hulu, Veoh, etc.) that stream content from web sites and/or permit content to be downloaded (e.g., via progressive download, etc.).

Head end 220 may include one or more devices, such as server devices, that ingest content, store content, format content, and/or deliver content to customer premises 230. For example, head end 220 may provide television channels, including content received from content providers 210, and/or multimedia streams from other sources to customer premises 230. Furthermore, head end 220 may provide Internet Protocol (IP) connectivity to customer premises 230 and may enable customer premises 230 to send and/or receive data to or from another device across an IP network (not shown in FIG. 2).

Customer premises 230 may include a particular location (or multiple locations) associated with a customer. For example, customer premises 230 may include the customer's home. Customer premises 230 may include one or more MoCA nodes 130-A to 130-N (referred to herein collectively as "MoCA nodes 130" and individually as "MoCA node 130"), a home router 240, an Ethernet device 250, and a WiFi device 260.

Home router 240 may receive content from head end 220 via a connection, such as, for example, via a fiber optic cable connection, a coaxial cable connection, a twisted pair connection, a wireless connection, and/or another type of connection. Furthermore, home router 240 may send information from a device associated with customer premises 230 to head end 220. In one implementation, home router 240 may include an optical network terminal (ONT) and head end 220 may form part of a high-speed fiber optic network. In another implementation, home router 240 may include a cable modem. In yet another implementation, home router 240 may include a fixed wireless transceiver. Additionally or alternatively, home router 240 may include a layer 2 and/or layer 3 network device, such as a switch, router, firewall, and/or gateway. Customer premises 230 may receive one or more services via the connection between home router 240 and head end 220, such as, for example, a television service, Internet service, and/or voice communication (e.g., telephone) service.

Home router 240 may support different types of interfaces, such as an Ethernet interface, a WiFi interface, and/or a MoCA interface. Home router 240 may manage the available bandwidth for customer premises 230. In order to manage the available bandwidth, home router 240 may need to determine a maximum bandwidth for each interface type. Furthermore, home router 240 may include a MoCA node.

MoCA node 130 may include one or more devices configured to receive content, such as a multimedia stream or data communication, over coaxial cables based on a MoCA standard. As an example, MoCA node 130 may include a set-top box that receives content, such as television content, from head end 220 and output the content to a television. As another example, MoCA node 130 may include a television device, a media server device, a computer device, a digital video recorder (DVR), and/or a gaming console.

Ethernet device 250 may include one or more devices that connect to home router 240 via an Ethernet interface. For example, Ethernet device 250 may include a personal computer or another device with Ethernet connectivity. WiFi device 260 may include one or more devices that connect to home router 240 via a WiFi interface. For example, WiFi device 260 may include a WiFi access point (e.g., a wireless router).

Although FIG. 2 shows exemplary components of environment 200, in other implementations, environment 200 may include fewer components, different components, differently arranged components, or additional components than depicted in FIG. 2. Additionally or alternatively, one or more components of environment 200 may perform functions described as being performed by one or more other components of environment 200.

Figure 3:
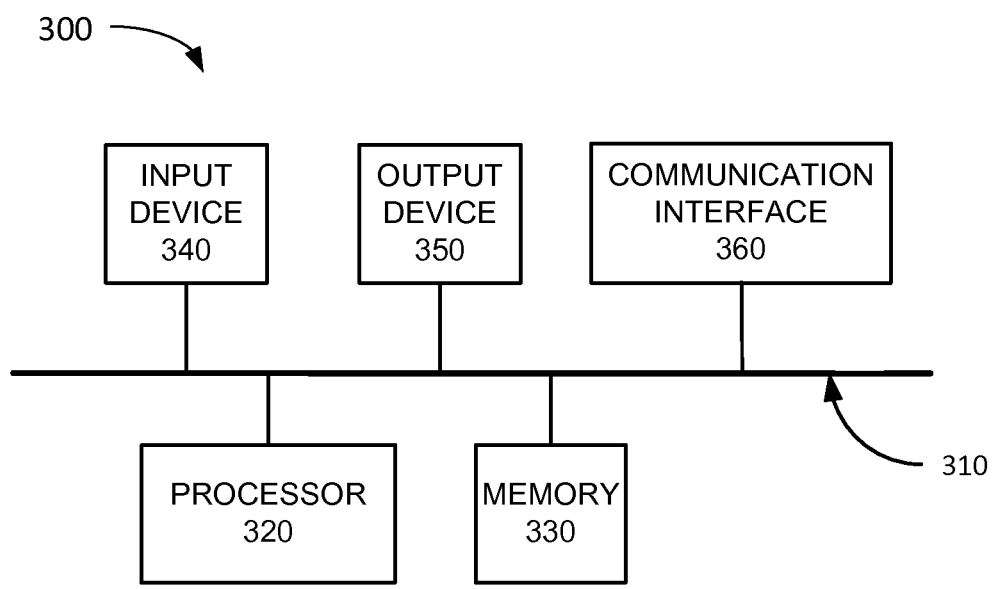
FIG. 3 is a diagram illustrating exemplary components of the home router of FIG. 1.

FIG. 3 is a diagram illustrating exemplary components of a device 300 according to an implementation described herein. Home router 240 may include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to an antenna for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to determining a maximum bandwidth in a mixed version MoCA deployment. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally or alternatively, one or more components of device 300 may perform one or more tasks described as being performed by one or more other components of device 300.

Figure 4:
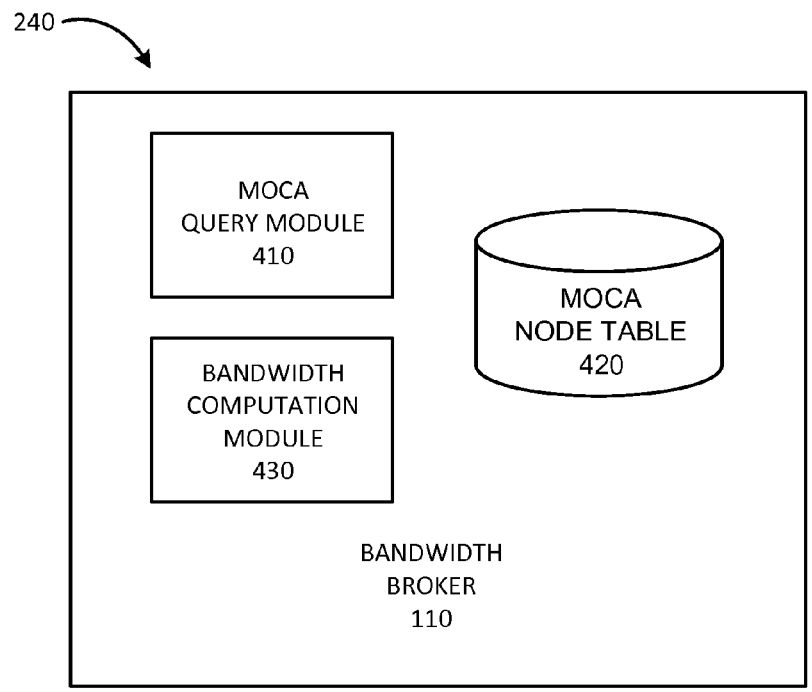
FIG. 4 is a diagram illustrating exemplary functional components of the home router of FIG. 1.

FIG. 4 is a diagram of exemplary functional components of home router 240. The functional components of home router 240 may be implemented, for example, via processor 320 executing instructions from memory 330. Alternatively, some or all of the functionality of home router 240 may be hardwired. As shown in FIG. 4, home router 240 may include bandwidth broker 110. Bandwidth broker 110 may include a MoCA query module 410, a MoCA node table 420, and a bandwidth computation module 430.

MoCA query module 410 may obtain information about MoCA nodes 130. For example, MoCA query module 410 may identify MoCA nodes 130 connected to home router 240 and may query a particular MoCA node 130 for a reported physical rate. The reported physical rate may correspond to a rate at which MoCA node 130 may receive data from home router 140. The reported physical rate may be measured, for example, in megabits per second (mbps). Furthermore, MoCA query module 410 may query a particular MoCA node 130 for a MoCA version supported by the particular MoCA node. For example, the particular MoCA node 130 may support MoCA version 1.1, MoCA version 2.0, or a future version of MoCA (e.g., MoCA 3.0).

MoCA node table 420 may store information about pairs of MoCA nodes 130. Exemplary information that may be stored in MoCA table 420 is described below with reference to FIG. 5.

Bandwidth computation module 430 may compute a maximum bandwidth for customer premises 230 based on MoCA nodes 130. For example, bandwidth computation module 430 may generate MoCA node table 420, which may include pairs of MoCA nodes, including home router 240 as one of the MoCA nodes, based on information obtained from MoCA query module 410. Bandwidth computation module 430 may determine a normalized physical rate for each of the pairs in the table and may determine the maximum bandwidth for the customer's network based on the minimum normalized physical rate for the pairs in the table.

Although FIG. 4 shows exemplary functional components of home router 240, in other implementations, home router 240 may include fewer functional components, different functional components, differently arranged functional components, or additional functional components than depicted in FIG. 4. Additionally or alternatively, one or more functional components of home router 240 may perform functions described as being performed by one or more other functional components of home router 240.

Figure 5:
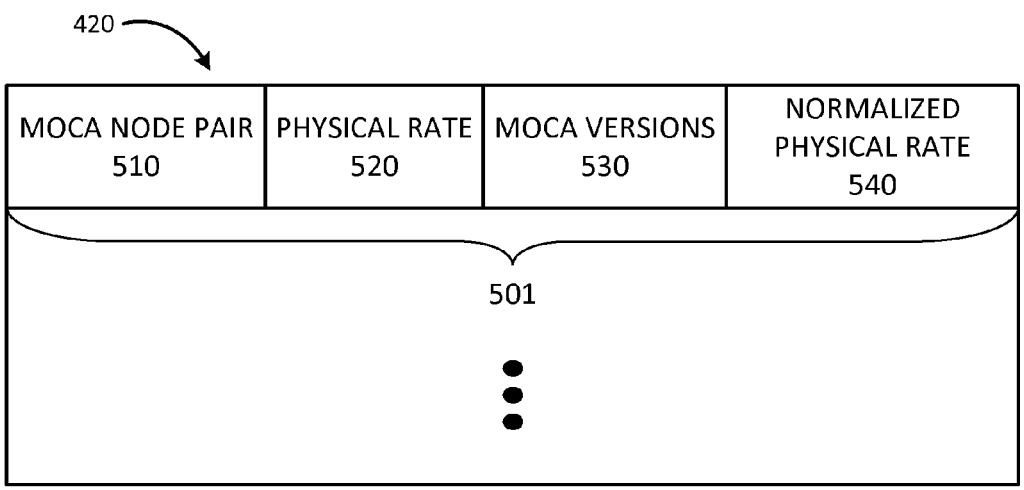
FIG. 5 is a diagram illustrating exemplary components that may be stored in the MoCA node table of FIG. 4.

FIG. 5 is a diagram illustrating exemplary components that may be stored in MoCA node table 420. As shown in FIG. 5, MoCA node table 420 may include one or more MoCA node entries 501 (referred to herein collectively as "MoCA node entries 501" and individually as "MoCA node entries 501"). Each MoCA node entry 501 may include a MoCA node pair entry 510, a physical rate entry 520, a MoCA versions entry 530, and a normalized physical rate entry 540.

MoCA node pair entry 510 may identify a particular pair of MoCA nodes 130. Physical rate entry 520 may store information about a reported physical rate associated with the particular pair of MoCA nodes 130. The reported physical rate may correspond to the measured physical bit rate between the first Moca node 130 of the particular pair and the second MoCA node 130 of the particular pair.

MoCA versions entry 530 may store information about the supported MoCA version of each of the two MoCA nodes 130 in the particular pair. For example, MoCA version entry 530 may indicate that both MoCA nodes 130 of the particular pair support MoCA version 1.1, that one MoCA node 130 of the particular pair supports MoCA version 1.1 and that the other MoCA node 130 of the particular pair supports MoCA version 2.0, that both MoCA nodes 130 of the particular pair support MoCA version 2.0, or that one or both of the MoCA nodes of the particular pair support another MoCA version (e.g., MoCA version 3.0).

Normalized physical rate entry 540 may include information about a normalized physical rate associated with the particular pair of MoCA nodes 130. The normalized physical rate may be determined by multiplying the reported physical rate by a normalization ratio. The normalization ratio may be based on a ratio of the theoretical maximum bandwidth associated with the supported MoCA versions for the two MoCA nodes 130 of the particular pair.

Although FIG. 5 shows exemplary components of MoCA node table 420, in other implementations, MoCA node table 420 may include fewer components, different components, differently arranged components, or additional components than depicted in FIG. 5.

Figure 6:
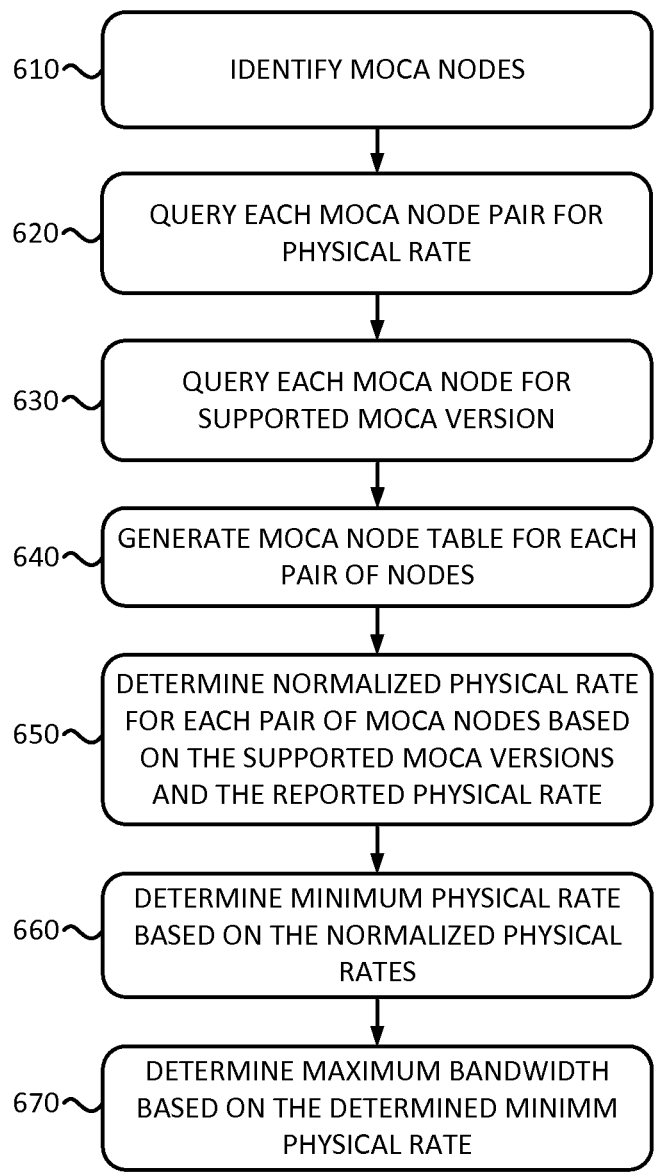
FIG. 6 is a flow chart of an exemplary process for determining the maximum bandwidth in a mixed version MoCA deployment according to an implementation described herein.

FIG. 6 is a flow chart of an exemplary process for determining the maximum bandwidth in a mixed version MoCA deployment according to an implementation described herein. In one implementation, the process of FIG. 6 may be performed by home router 240. In other implementations, some or all of the process of FIG. 6 may be performed by another device or a group of devices separate from home router 240 and/or including home router 240.

The process of FIG. 6 may include identifying MoCA nodes (block 610). For example, MoCA query module 410 may identify MoCA node 130 when MoCA node 130 is connected to home router 240 via a MoCA interface and when MoCA node 130 identifies itself with a MoCA identifier (ID). Each identified MoCA node pair may be queried for a physical rate (block 620). For example, MoCA query module 410 may use a physical rate query application programming interface (API) to determine the physical rate between each pair of MoCA nodes from the identified MoCA nodes. Each identified MoCA node may be queried for the supported MoCA version (block 630). For example, MoCA query module 410 may send a query to each of the identified MoCA nodes to identify the MoCA version supported by each of the identified MoCA nodes.

A MoCA node table may be generated for each pair of MoCA nodes (block 640). For example, bandwidth computation module 430 may generate MoCA node table 420, wherein MoCA node table 420 includes an entry for each pair of Moca nodes of the identified MoCA nodes. A normalized physical rate for each pair of MoCA nodes may be determined based on the supported MoCA versions associated with the pair of MoCA nodes and based on the reported physical rate for the pair of MoCA nodes (block 650). A process for determining a normalized physical rate for a pair of MoCA nodes is described below with reference to FIG. 7.

A minimum physical rate may be determined based on the normalized physical rates (block 660). For example, bandwidth computation module 430 may select the lowest of the normalized physical rates as the minimum physical rate. A maximum bandwidth may be determined based on the determined minimum physical rate (block 670). For example, bandwidth computation module 430 may select a particular percentage (e.g., 80 percent) of the determined minimum physical rate as the maximum bandwidth for the MoCA interface. The remaining bandwidth, of the determined minimum physical rate, may be reserved for MoCA interface management, for bandwidth variation due to environmental variations, and/or for other factors.

Figure 7:
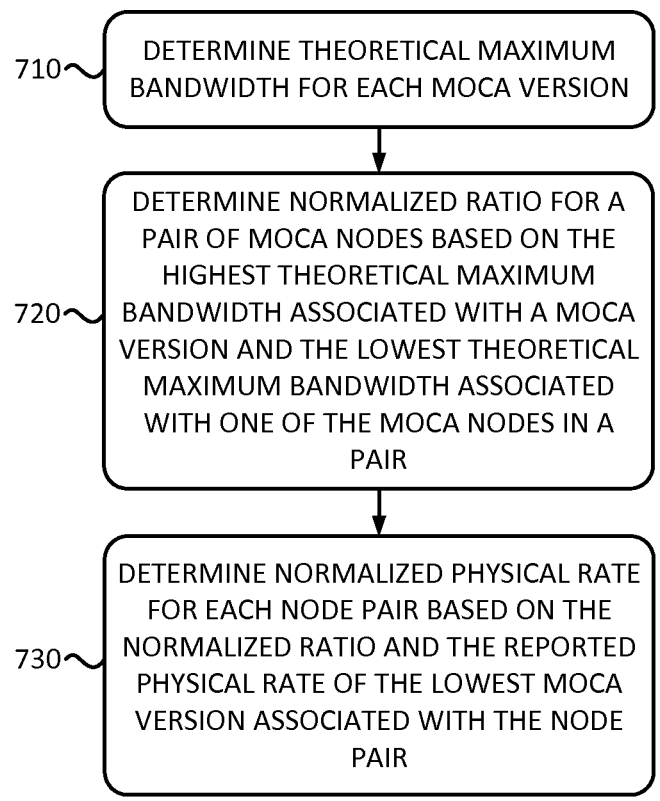
FIG. 7 is a flow chart of an exemplary process for determining a normalized physical rate for a pair of MoCA nodes according to an implementation described herein.

FIG. 7 is a flow chart of an exemplary process for determining a normalized physical rate for a pair of MoCA nodes according to an implementation described herein. In one implementation, the process of FIG. 7 may be performed by home router 240. In other implementations, some or all of the process of FIG. 7 may be performed by another device or a group of devices separate from home router 240 and/or including home router 240.

The process of FIG. 7 may include determining a theoretical maximum bandwidth for each MoCA version (block 710). For example, each particular MoCA version may be associated with a theoretical maximum bandwidth based on the particular MoCA version specification. A higher MoCA version may be associated with a higher theoretical maximum bandwidth. For example, MoCA version 1.1 may be associated with a theoretical maximum bandwidth of 175 Megabits per second and MoCA version 2.0 may be associated with a theoretical maximum bandwidth of 700 Megabits per second. A future MoCA version may be associated with a theoretical maximum bandwidth that is higher than 700 Megabits per second.

A normalized ratio (NR) for a pair of MoCA nodes for each pair of nodes may be determined based on the highest theoretical maximum bandwidth associated with a MoCA version supported by a MoCA node in the network and based on the lowest theoretical maximum bandwidth associated with one of the MoCA nodes in a pair of MoCA nodes (block 720).

For example, in a network that includes MoCA nodes 130 supporting MoCA version 1.1 and MoCA nodes 130 supporting MoCA version 2.0, the highest supported MoCA version may be MoCA version 2.0 and the normalized ratios may be based on MoCA version 2.0. Since MoCA version 1.1 may take twice the time on the wire to transmit the same amount of data as MoCA version 2.0, the normalization ratio may be 2 for a pair of MoCA nodes in which one of the MoCa nodes supports MoCA version 1.1 and the normalization ratio may be 1 for a pair of MoCA nodes with both MoCA nodes supporting MoCA version 2.0.

Generalizing this concept, assume three supported MoCA versions for MoCA nodes 130 in customer premises 230: MoCA version 1.1, MoCA version 2.0, and a future version of MoCA (e.g., MoCA version 3.0), and assume a theoretical maximum bandwidth x for MoCA version 1.1, a theoretical maximum bandwidth y for MoCA version 2.0, and a theoretical maximum bandwidth z for the future MoCA version.

The normalized ratio for a pair of MoCA nodes may correspond to: $NR_{1.1}=z \div x$, for a pair of MoCA nodes wherein the lowest MoCA version associated with one of the MoCA nodes in the pair of MoCA nodes is MoCA version 1.1; $NR_{2.0}=z \div y$, for a pair of MoCA nodes wherein the lowest MoCA version associated with one of the MoCA nodes in the pair of MoCA nodes is MoCA version 2.0; and $NR_{vf}=z \div z$, for a pair of MoCA nodes wherein the lowest MoCA version associated with one of the MoCA nodes in the pair of MoCA nodes is the future MoCA version.

A normalized physical rate may be determined for a pair of MoCA nodes based on the normalized ratio for the pair of MoCA nodes and based on the reported physical rate for the pair of MoCA nodes (block 730). The normalized ratio for a pair of MoCA nodes may be multiplied by the reported physical rate for the pair of MoCA nodes to generate the normalized physical rate for the pair of MoCA nodes. For example, the normalized physical rate for a pair of MoCA nodes wherein the lowest MoCA version associated with one of the MoCA nodes in the pair of MoCA nodes is MoCA version 1.1 may be $NR_{1.1}$ times the reported physical rate for the pair of MoCA nodes; the normalized physical rate for a pair of MoCA nodes wherein the lowest MoCA version associated with one of the MoCA nodes in the pair of MoCA nodes is MoCA version 2.0 may be $NR_{2.0}$ times the reported physical rate for the pair of MoCA nodes; and the normalized physical rate for a pair of MoCA nodes wherein the lowest MoCA version associated with one of the MoCA nodes in the pair of MoCA nodes is a future MoCA version may be $NR_{vf}$ times the reported physical rate for the pair of MoCA nodes.

Figure 8:
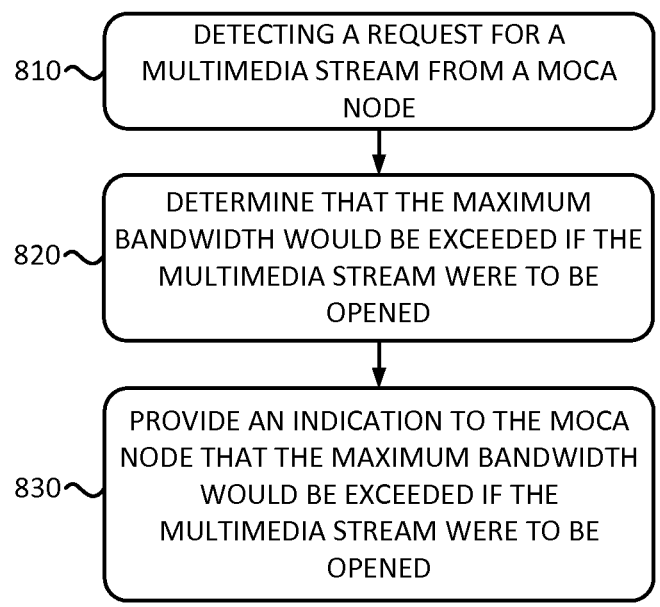
FIG. 8 is a flow chart of an exemplary process for providing an indication to a MoCA node about exceeding the maximum bandwidth according to an implementation described herein.

FIG. 8 is a flow chart of an exemplary process for providing an indication to a MoCA node about exceeding the maximum bandwidth according to an implementation described herein. In one implementation, the process of FIG. 8 may be performed by home router 240. In other implementations, some or all of the process of FIG. 8 may be performed by another device or a group of devices separate from home router 240 and/or including home router 240.

The process of FIG. 8 may include detecting a request for a multimedia stream from a MoCA node (block 810). For example, home router 240 may detect a request from a media server, corresponding to MoCA node 130, to stream an on-demand movie. A determination may be made that the maximum bandwidth would be exceeded if the multimedia stream were to be opened or downloaded (block 820). For example, bandwidth broker 110 may determine the maximum bandwidth for a MoCA interface based on a determination made by bandwidth computation module 430. Bandwidth broker 110 may determine the current bandwidth use and may determine whether the additional reserved bandwidth for the requested multimedia stream would exceed the maximum bandwidth. For example, a first user at customer premises 230 may be watching a television program via a set-top box, corresponding to a first MoCA node 130, and a second user may be playing an online game via a gaming console, corresponding to a second MoCA node 130. Adding the requested multimedia stream may exceed the determined maximum bandwidth for the MoCA interface of home router 240.

An indication may be provided to the MoCA node, which requested the multimedia stream, that the maximum bandwidth would be exceeded if the multimedia stream were to be opened or otherwise provided (block 830). For example, bandwidth broker 110 of home router 240 may send a visual and/or audio message to be outputted by the requesting MoCA node 130, indicating to the user that the maximum bandwidth would be exceeded. The indication may include an advice to the user to close one of the other existing MoCA streams to free up some bandwidth.

Figure 9:
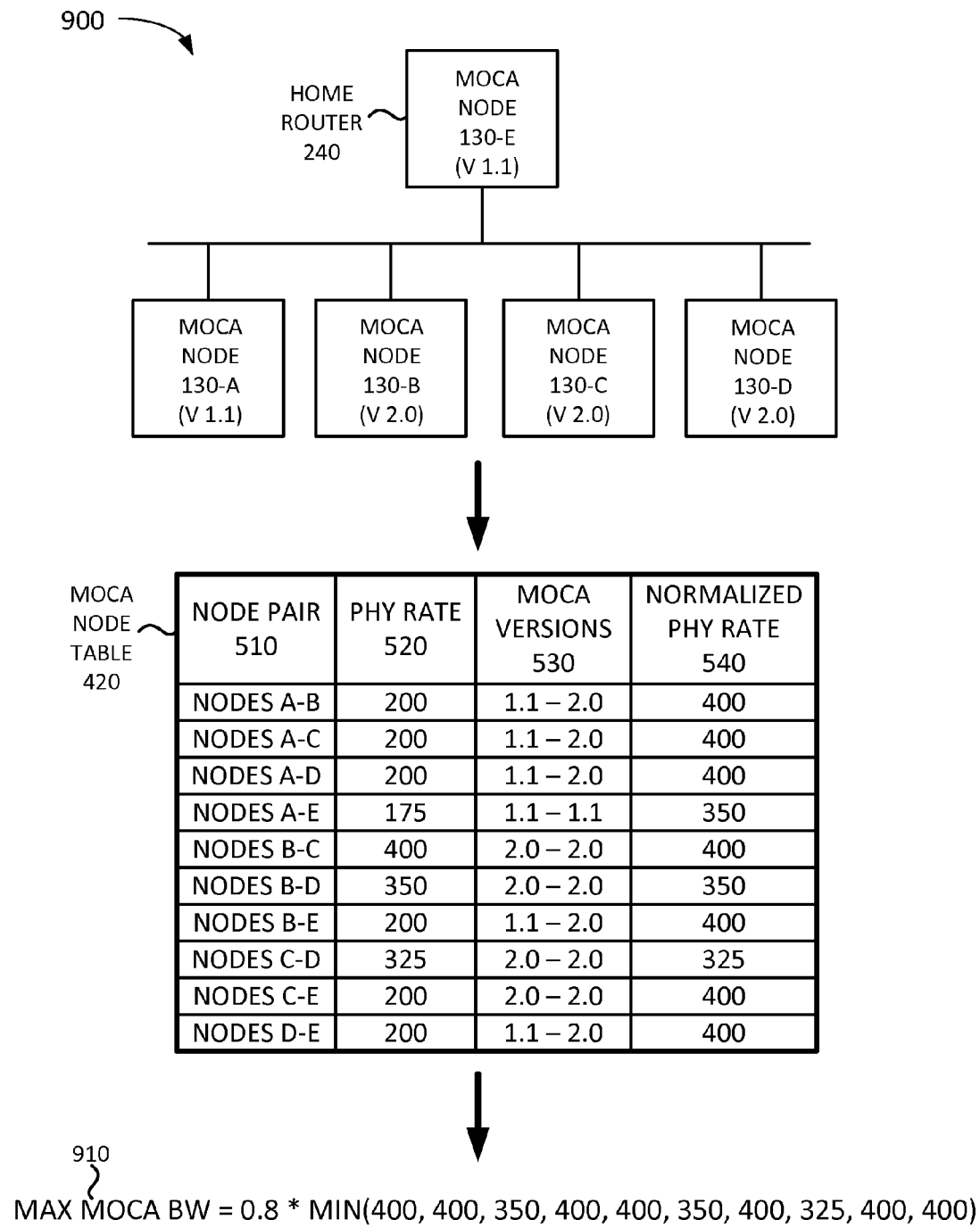
FIG. 9 is a diagram of an example that illustrates an implementation described herein.

FIG. 9 is a diagram of an example 900 that illustrates an implementation described herein. As shown in FIG. 9, example 900 may include a customer premises network that includes 5 MoCA nodes: MoCA node 130-A, MoCA node 130-B, MoCA node 130-C, MoCA node 130-D, and MoCA node 130-E (corresponding to home router 240). Assume MoCA node 130-A supports MoCA version 1.1, MoCA node 130-B supports MoCA version 2.0, MoCA node 130-C supports MoCA version 2.0, MoCA node 130-D supports MoCA version 2.0, and MoCA node 130-E supports MoCA version 1.1.

Bandwidth computation module 430 may generate MoCA node table 420 for all possible pairs of the Moca nodes. Physical rates field 520 may store the reported physical rate for each pair of MoCA nodes 130 in Megabits per second. For example, the lowest reported physical rate may be between MoCA node 130-A and MoCA node 130-E and the highest reported physical rate may be between MoCA node 130-B and MoCA node 130-C.

Bandwidth computation module 430 may determine a normalized physical rate for each pair. The highest supported MoCA version in example 900 may be MoCA version 2.0 and thus the normalized physical rate may be based on normalization ratios based on MoCA version 2.0. The normalized physical rates may be determined for the pairs of MoCA nodes as 400, 400, 400, 350, 400, 350, 400, 325, 400, and 440 Megabits per second, respectively. Thus, the minimum physical rate may be selected as 325 Megabits per second. The maximum bandwidth for the MoCA interface may be selected as 80% of the minimum physical rate, namely 260 Megabits per second.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 6-8, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method performed by a computer device, the method comprising:
   identifying, by the computer device, Multimedia over Coaxial Alliance nodes associated with a customer's network;
   querying, by the computer device, particular pairs of the identified Multimedia over Coaxial Alliance nodes for physical rates to obtain reported physical rates for the particular pairs of the identified Multimedia over Coaxial Alliance nodes;
   querying, by the computer device, particular ones of the identified Multimedia over Coaxial Alliance nodes for supported Multimedia over Coaxial Alliance versions; and
   determining, by the computer device, a maximum bandwidth for the customer's network based on the reported physical rates and based on the supported Multimedia over Coaxial Alliance versions.

2. The method of claim 1, further comprising:
   generating a table of the particular pairs of the Multimedia over Coaxial Alliance nodes, wherein the computer device is included as one of the Multimedia over Coaxial Alliance nodes.

3. The method of claim 2, further comprising:
   determining a normalized physical rate for a particular one of the particular pairs of the Multimedia over Coaxial Alliance nodes, based on the supported Multimedia over Coaxial Alliance version associated with each Multimedia over Coaxial Alliance node of the particular one of the particular pairs, and based on the reported physical rate associated with the particular one of the particular pairs.

4. The method of claim 3, further comprising:
determining a minimum physical rate for the customer's network based on a minimum of all the determined normalized physical rates.

5. The method of claim 4, wherein determining the maximum bandwidth for the customer's network includes:
determining the maximum bandwidth as a particular percentage of the determined minimum physical rate.

6. The method of claim 3, wherein determining the normalized physical rate for the particular one of the particular pairs of the Multimedia over Coaxial Alliance nodes includes:
determining a theoretical maximum physical rate for each supported Multimedia over Coaxial Alliance version associated with the identified Multimedia over Coaxial Alliance nodes;
determining a normalized ratio for the particular one of the particular pairs of the Multimedia over Coaxial Alliance nodes based on the determined theoretical maximum physical rates and based on a lowest theoretical maximum bandwidth associated with one of the MoCA nodes in the particular one of the particular pairs of the Multimedia over Coaxial Alliance nodes; and
determining the normalized physical rate for the particular one of the particular pairs of the Multimedia over Coaxial Alliance nodes based on the normalized ratio and based on a reported physical rate associated with the particular one of the particular pairs of the Multimedia over Coaxial Alliance nodes.

7. The method of claim 1, wherein the supported Multimedia over Coaxial Alliance versions include one or more of:
a Multimedia over Coaxial Alliance version 1.1;
a Multimedia over Coaxial Alliance version 2.0; or
a Multimedia over Coaxial Alliance version 3.0.

8. The method of claim 1, wherein the Multimedia over Coaxial Alliance nodes include one or more of:
a set-top box;
a media server device;
a digital video recorder;
a personal computer; or
a gaming console.

9. The method of claim 1, further comprising:
detecting a request for a multimedia stream from one of the identified Multimedia over Coaxial Alliance nodes;
determining that the maximum bandwidth for the customer's network would be exceeded if the requested multimedia stream were to be provided; and
providing an indication to the one of the identified Multimedia over Coaxial Alliance nodes that the maximum bandwidth would be exceeded if the maximum bandwidth for the customer's network would be exceeded, in response to determining that the maximum bandwidth for the customer's network would be exceeded if the requested multimedia stream were to be provided.

10. A device comprising:
logic configured to:
identify Multimedia over Coaxial Alliance nodes associated with a customer's network;
query particular pairs of the identified Multimedia over Coaxial Alliance nodes for physical rates to obtain reported physical rates for the particular pairs of the identified Multimedia over Coaxial Alliance nodes;
query particular ones of the identified Multimedia over Coaxial Alliance nodes for supported Multimedia over Coaxial Alliance versions; and
determine a maximum bandwidth for the customer's network based on the reported physical rates and based on the supported Multimedia over Coaxial Alliance versions.

11. The device of claim 10, wherein the logic is further configured to:
generate a table of the particular pairs of the Multimedia over Coaxial Alliance nodes, wherein the computer device is included as one of the Multimedia over Coaxial Alliance nodes.

12. The device of claim 11, wherein the logic is further configured to:
determine a normalized physical rate for a particular one of the particular pairs of the Multimedia over Coaxial Alliance nodes, based on the supported Multimedia over Coaxial Alliance version associated with each Multimedia over Coaxial Alliance node of the particular one of the particular pairs, and based on the reported physical rate associated with the particular one of the particular pairs.

13. The device of claim 12, wherein the logic is further configured to:
determine a minimum physical rate for the customer's network based on a minimum of all the determined normalized physical rates.

14. The device of claim 13, wherein the logic is further configured to:
determine the maximum bandwidth as a particular percentage of the determined minimum physical rate.

15. The device of claim 12, wherein the logic is further configured to:
determine a theoretical maximum physical rate for the supported Multimedia over Coaxial Alliance version associated with each Multimedia over Coaxial Alliance node of the particular one of the particular pairs;
determine a normalized ratio for the particular one of the particular pairs of the Multimedia over Coaxial Alliance nodes based on the determined theoretical maximum physical rates and based on a lowest theoretical maximum bandwidth associated with one of the MoCA nodes in the particular one of the particular pairs of the Multimedia over Coaxial Alliance nodes; and
determine the normalized physical rate for the particular one of the particular pairs of the Multimedia over Coaxial Alliance nodes based on the normalized ratio and based on a reported physical rate associated with the particular one of the particular pairs of the Multimedia over Coaxial Alliance nodes.

16. The device of claim 12, wherein the logic is further configured to:
detect a request for a multimedia stream from one of the identified Multimedia over Coaxial Alliance nodes;
determine that the maximum bandwidth for the customer's network would be exceeded if the requested multimedia stream were to be provided; and
provide an indication to the one of the identified Multimedia over Coaxial Alliance nodes that the maximum bandwidth would be exceeded if the maximum bandwidth for the customer's network would be exceeded, in response to determining that the maximum bandwidth for the customer's network would be exceeded if the requested multimedia stream were to be provided.

17. A non-transitory computer-readable medium storing instructions executable by one or more processors, the non-transitory computer-readable medium comprising:

one or more instructions to identify Multimedia over Coaxial Alliance nodes associated with a customer's network;

one or more instructions to query particular pairs of the identified Multimedia over Coaxial Alliance nodes for physical rates to obtain reported physical rates for the particular pairs of the identified Multimedia over Coaxial Alliance nodes;

one or more instructions to query particular ones of the identified Multimedia over Coaxial Alliance nodes for supported Multimedia over Coaxial Alliance versions; and one or more instructions to determine a maximum bandwidth for the customer's network based on the reported physical rates and based on the supported Multimedia over Coaxial Alliance versions.

18. The non-transitory computer-readable medium of claim 17, further comprising:

one or more instructions to generate a table of the particular pairs of the Multimedia over Coaxial Alliance nodes, wherein the one or more processors are included as one of the Multimedia over Coaxial Alliance nodes;

one or more instructions to determine a normalized physical rate for a particular one of the particular pairs of the Multimedia over Coaxial Alliance nodes, based on the supported Multimedia over Coaxial Alliance version associated with each Multimedia over Coaxial Alliance node of the particular one of the particular pairs, and based on the reported physical rate associated with the particular one of the particular pairs;

one or more instructions to determine a minimum physical rate for the customer's network based on a minimum of all the determined normalized physical rates; and one or more instructions to determine the maximum bandwidth as a particular percentage of the determined minimum physical rate.

19. The non-transitory computer-readable medium of claim 18, further comprising:

one or more instructions to determine a theoretical maximum physical rate for the supported Multimedia over Coaxial Alliance version associated with each Multimedia over Coaxial Alliance node of the particular one of the particular pairs;

one or more instructions to determine a normalized ratio for the particular one of the particular pairs of the Multimedia over Coaxial Alliance nodes based on the determined theoretical maximum physical rates and based on a lowest theoretical maximum bandwidth associated with one of the MoCA nodes in the particular one of the particular pairs of the Multimedia over Coaxial Alliance nodes; and one or more instructions to determine the normalized physical rate for the particular one of the particular pairs of the Multimedia over Coaxial Alliance nodes based on the normalized ratio and based on a reported physical rate associated with the particular one of the particular pairs of the Multimedia over Coaxial Alliance nodes.

20. The non-transitory computer-readable medium of claim 17, further comprising:

one or more instructions to detect a request for a multimedia stream from one of the identified Multimedia over Coaxial Alliance nodes;

one or more instructions to determine that the maximum bandwidth for the customer's network would be exceeded if the requested multimedia stream were to be provided; and one or more instructions to provide an indication to the one of the identified Multimedia over Coaxial Alliance nodes that the maximum bandwidth for the customer's network would be exceeded, in response to determining that the maximum bandwidth for the customer's network would be exceeded if the requested multimedia stream were to be provided.

* * * * *